Nov. 5, 1963   H. E. WOLNER   3,109,667
COASTER VEHICLE FOR CHILDREN
Filed Dec. 22, 1960
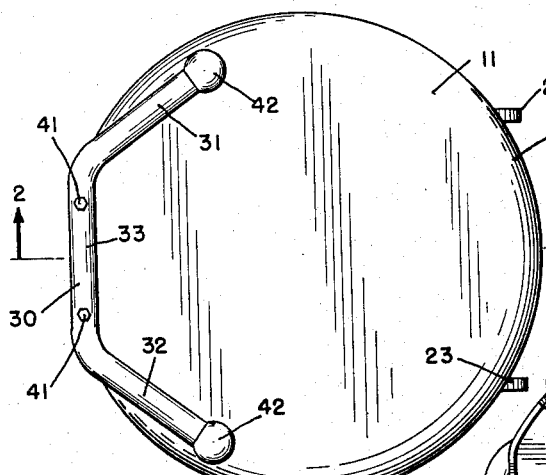
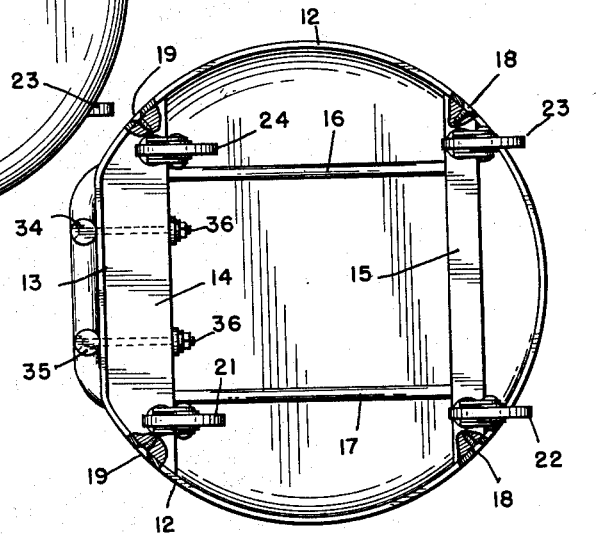
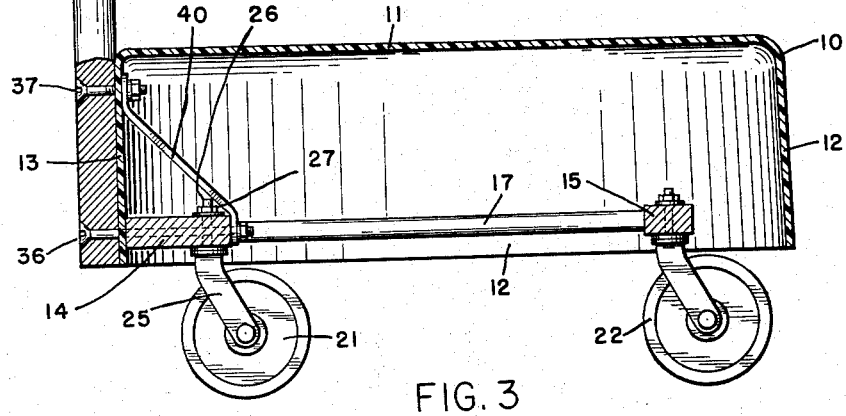
INVENTOR.
HERBERT E. WOLNER
BY
Caswell Lagaard & Wicks
ATTORNEYS

United States Patent Office 3,109,667
Patented Nov. 5, 1963

3,109,667
COASTER VEHICLE FOR CHILDREN
Herbert E. Wolner, Mound, Minn.
Filed Dec. 22, 1960, Ser. No. 77,717
1 Claim. (Cl. 280—87.02)

The herein disclosed invention relates to wheeled vehicles and particularly to a vehicle adapted to be used by a small child.

An object of the invention resides in providing a vehicle having an inverted cup-shaped seat provided with a top and a flange depending therefrom.

Another object of the invention resides in providing transverse frame members extending across said flange and in further providing caster wheels carried by said frame members and supporting said vehicle for movement over the surface on which it rests.

A still further object of the invention resides in providing a post overlying the flange and extending upwardly therefrom and in addition providing a handle bar secured to said post.

A feature of the invention resides in providing the flange with a flat and in utilizing two posts for supporting said handle bar and disposed adjacent said flat and extending upwardly therefrom.

Another object of the invention resides in disposing one of said frame members adjacent said flat and in providing bolts extending through said posts, flat and frame member for attaching the posts to the seat.

Another object of the invention resides in constructing said handle bar, U-shaped in form, with arms overlying and extending along the marginal portions of the seat.

Other objects of the invention reside in the novel combination and arrangement of parts and in the details of construction hereinafter illustrated and/or described.

In the drawings:

FIG. 1 is a plan view of a wheeled vehicle illustrating an embodiment of the invention.

FIG. 2 is an inverted view of the structure shown in FIGURE 1.

FIG. 3 is an elevational, sectional view taken on line 3—3 of FIGURE 1 and drawn to a greater scale.

The invention comprises a seat 10 which is of an inverted cup-shaped form having a relatively flat circular top 11 and a depending flange 12 extending about the same and of appreciable depth. This flange is formed at the forward portion of the same with a flat 13, the remainder of the flange being circular. The seat 10 may be constructed of a plastic material or metal, shaped in the desired form.

Extending across the flange 12 and disposed adjacent the flat 13 is a transverse frame member 14. This frame member may be constructed of wood and is attached to the flat 13 by means of screws 19 which extend through said flat and are screwed into said frame member. A second frame member 15 is disposed at the rearward portion of the seat and extends across the flange 12. This frame member is parallel with the frame member 14 and is spaced therefrom. The frame member 15 is attached to the flange 12 in the same manner as the frame member 14 by means of screws 18 which extend through the flange 12 and are screwed into the ends of said frame member. Two rungs 16 and 17 extend between the two frame members 14 and 15 and tie the same together.

Attached to the frame members 14 and 15 are four caster wheels 21, 22, 23 and 24 which support the vehicle for movement. These wheels are identical in construction and only the wheel 21 will be described. This wheel is of conventional form being constructed of rubber or some other similar suitable material and is mounted in an off set fork 25. The fork 25 is pivoted to a threaded shank 26 and which extends through the supporting member 14. A nut 27 screwed on said shank clamps the same in position.

For manipulating the vehicle, a handle bar 30 is employed which is U-shaped in form and has arms 31 and 32 serving as hand grips and a connecting portion 33 therebetween. The handle bar 30 is attached to the upper ends of two vertical posts 34 and 35 which overlie the flat 13 of flange 12. These posts are secured to said flat by means of bolts 36 and 37. The bolts 36 extend through said posts, the flat 13 and the frame member 14. The bolts 37 similarly extend through said posts and the flat 13 and are disposed upwardly of the bolts 36 and near the top 11 of seat 10.

A brace 40 extends between the rearward portion of the frame member 14 and the upper portion of the flat 13 and is clamped in position by means of the bolts 37, as best shown in FIGURE 3. The handle bar 30 is attached to the posts 35 by means of lag screws 41 which extend through said handle bar and are screwed into the upper ends of said posts. Knobs 42 are attached to the ends of the hand grips 31 and finish off the ends of the same. The posts 35 and 36 are preferably constructed of wood while the handle bar 30 is constructed of tubular metal bent to form the handle grips 31 and 32 which overlie and extend along the marginal portions of the seat adjacent the flange 12 thereof.

In the use of the vehicle, the child sits on the top 11 of the seat 10 with its legs straddling the posts 34 and 35. In operating the vehicle the child engages the surface on which the vehicle is operated by touching the same with the feet and moving the feet to propel the vehicle. The vehicle may be steered while the feet engage the said surface by turning the vehicle to the right or left by manipulation of the handle bar 30.

If desired, the vehicle may be drawn by the attachment of a rope to the transverse frame member 15. In such case, the child sits on the seat 10 with his back supported both by the posts 35 and the handle bar 30 and holds its position by grasping the handle grips 31 and 32.

The advantages of the invention are manifest. The device is extremely simple in construction and can be fabricated at a nominal expense. The vehicle is low so that the child cannot fall off from the same and receive injuries thereby. The vehicle may be propelled either by the child or by another person drawing the vehicle in the manner of a wagon or similar vehicle.

Changes in the specific form of the invention, as herein described, may be made within the scope of what is claimed without departing from the spirit of the invention.

Having described the invention, what is claimed as new and desired to be protected by Letters Patent is:

A wheeled vehicle comprising an inverted cup-shaped seat generally circular in form having a top and a flange depending therefrom, said flange having a flat on one side thereof, a transverse frame member extending across said flange and disposed adjacent said flat at the lower portion thereof, posts overlying said flat and extending upwardly therefrom, braces extending diagonally upwardly between the inner edge of said frame member and the upper portion of said flat, bolts extending through the lower ends of said posts, the lower portion of said flat, said frame member and the lower ends of said braces, other bolts extending through said posts intermediate their ends, the upper portion of said flange and the upper ends of said braces, a handle bar secured to the upper ends of said posts, a second frame member extending across said flange and disposes rearwardly of said first named frame member and wheels carried by said frame members and supporting the vehicle for movement.

References Cited in the file of this patent

UNITED STATES PATENTS

| | | |
|---|---|---|
| D. 175,262 | Kousens | Aug. 2, 1955 |
| 845,673 | Vanmanen | Feb. 26, 1907 |
| 1,286,539 | Colon | Dec. 3, 1918 |
| 1,432,612 | O'Connor | Oct. 17, 1922 |
| 1,849,028 | Robinson | Mar. 8, 1932 |
| 2,988,370 | Bertram | June 13, 1961 |